United States Patent [19]

Henning

[11] Patent Number: 4,745,800

[45] Date of Patent: May 24, 1988

[54] PROCESS AND DEVICE FOR FLOW MEASUREMENT

[75] Inventor: Hans J. Henning, Neuss, Fed. Rep. of Germany

[73] Assignee: Pierburg Luftfahrtgeräte Union G.m.b.H., Fed. Rep. of Germany

[21] Appl. No.: 71,890

[22] Filed: Jul. 10, 1987

[30] Foreign Application Priority Data

Jul. 18, 1986 [DE]  Fed. Rep. of Germany ....... 3624264

[51] Int. Cl.[4] .............................................. G01F 9/00
[52] U.S. Cl. ................................... 73/119 A; 73/114; 73/861.01
[58] Field of Search ................. 73/861.01, 119 A, 114

[56] References Cited

U.S. PATENT DOCUMENTS 4,098,113  7/1978  Erwin, Jr. ................... 73/119 A X
4,141,240  2/1979  Usui et al. ............................. 73/114

Primary Examiner—Jerry W. Myracle
Attorney, Agent, or Firm—Toren, McGeady & Associates

[57] ABSTRACT

In a process for measuring the flow of fluids that are subject to temperature changes, particularly for measuring the fuel consumption of an internalcombustion engine with fuel injection, the volumetric capacity of the supply system holding the liquid between the consuming device and the flow meter is automatically increased or decreased corresponding to the change in volume of the fluid caused by temperature. The fluid volume, which increases on heating up and decreases on cooling, no longer causes errors of measurement in the meter.

11 Claims, 3 Drawing Sheets

PROCESS AND DEVICE FOR FLOW MEASUREMENT

The invention relates to a process for measuring the flow of fluids that are subject to temperature variations, especially for measuring the fuel consumption of an internal combustion engine with fuel injection, and to a device for carrying out the process.

To measure the fuel consumption of an internal combustion engine with fuel injection, a flow meter is placed in a fuel line ahead of the injector of the engine. The volume of fluid enclosed in the system between the meter and the injector is a quantity that cannot be neglected if the measurements are to be reliable. This is because, as a result of temperature changes that may be caused, for example, by the transfer of heat from the surroundings or by heating of the fuel flowing back from the injection system, the volume of fluid enclosed may be increased or, in the case of cooling, decreased.

The changes in volume show up as errors in measurement in the meter, since the amount of fuel forced back by the expansion of the fluid, or the additional amount of fuel sucked in by contraction, is measured as a decreased or increased consumption of fuel by the engine. The meter records the greater fluid volume due to the higher temperature as a reduced consumption of fuel, while at a lower temperature the effect is reversed. The error in measurement is increased if the volume of fluid enclosed is further increased when, as is frequently unavoidable for reliable operation of the engine, vapour bubble removers, filters or other additional or auxiliary devices are connected ahead of the injection system. The error of measurement is often so serious, particularly when the flow is small and the volume of fluid enclosed is large, that compensation is necessary, for example by indirect measurement using a correction factor derived from the measured temperature.

The problem of changes in volume that give rise to errors in measurement can occur in the calibration of flow meters, in other flow measurements, in the standardisation of measuring instruments and in testing, for example, carburetors, injection nozzles, injection pumps, etc., when there is a volume in the lines between the test-piece, or the point at which the flow is to be determined, and the engine.

The object of the invention is to avoid the above-mentioned disadvantages and to make it possible to measure the flow directly without the volume of fluid enclosed in the system of supply lines, which increases on heating and decreases on cooling, causing a measuring error in the meter.

According to the invention this object is achieved by automatically increasing or decreasing the volumetric capacity of the system of lines holding the fluid beyond the flow meter (in the direction of flow) corresponding to the change in volume of the fluid due to the temperature. The change in the volume of the enclosed fluid, by which is to be understood, in this connection, the volume of fluid standing or flowing, as the case may be, in the lines and possibly in the auxiliary devices between the flow meter and the injection system of the internal combustion engine, is thus compensated by a corresponding change in the volume of the space available for the fluid in the line system. In other words, to the same extent as changes in the volume of fluid occur, the volume of the space in the system through which the fluid flows simultaneously changes. A temperature-dependent change in the volume of the fluid thus does not affect the flow meter so as to cause errors, since the amount of fluid flowing through the flow meter remains completely uninfluenced by the changes in volume brought about by variations in temperature. Consequently the meter does not record any apparently reduced or increased fuel consumption by the engine due to such volume changes.

A device for automatically increasing or decreasing the volume of the space can consist of an assembly arranged in the pipe line between the flow meter and the consuming device which changes the volume in dependence on the temperature. By an assembly is meant here components, particularly expansion elements, having the property of responding to differences in temperature by changing their shape or position, in particular bimetallic discs, pressure cells and temperature sensors and wax-filled cartridges. Instead of bimetallic springs or discs and expansion devices other suitable thermal expansion elements can be used.

In the case of a fuel supply line including a gas bubble separator arranged before the injection system, a device for automatically increasing or decreasing the volume of the space can preferably consist of a bimetallic spring around which the fuel flows in the interior of the casing of the gas bubble separator connected to a supply line. The bimetallic spring, inserted for example into two grooves in the casing, bulges, in the case of an increase in the fluid temperature, towards the compensation chamber, whereby a correspondingly larger space is made available for the fluid within the casing, corresponding to the greater temperature-dependent volume of the fluid. Should fluid having a temperature lower than the standard temperature flow into the gas bubble separator, the bimetallic spring bulges in the other direction and reduces the space corresponding to the changed smaller volume of fluid. In the case of a switching element (bimetallic spring, bimetallic disc) around which the flow passes, the switching speed is increased.

A gas bubble separator connected to a fuel line can however preferably have a bimetallic spring arranged in the fluid chamber and connected to a displacing member that separates the fluid chamber, beneath the inlet and outlet ports, from a compensation chamber. In this case the displacing member separating the chambers from one another, preferably a membrane or a displaceable piston, effects a matching adjustment of the volume of the compensation chamber to the respective volume of fluid, advantageously via a connecting rod.

In another embodiment for volume compensation two tubes engaging one within the other and displaceable relative to one another, in the form of a pipeline comprising an inner telescope tube and an outer sleeve tube, form an extendable pipe connection, for example in a fuel line. Here the telescope tube which fits into the sleeve-like end of the sleeve tube can be urged by a spring against at least one but preferably several bimetallic discs arranged in the sleeve tube so as to bend out in opposite directions. The force of the spring and the force due to the bending or bulging out of the bimetallic discs are adjusted so that the telescope tube, that is to say the inner tube that projects into the outer sleeve tube, is, in the case of cooler fluid, moved inwards by the spring against the then less bulging bimetallic disc, and in the case of warmer fluid it is moved correspondingly farther out of the sleeve tube by the oppositely convex bimetallic discs.

Volumetric compensation by a device integrated directly in a fuel line can also be effected by a hose-like, flexible connecting piece fixed to two spaced and opposed tube ends and surrounding a jacket surface formed of bimetallic springs, preferably in the form of strips. The elastic connecting piece, which may, like a membrane, consist for example of leather, plastics material or rubber, is bent outwards by the bimetallic springs when the temperature of the fluid, or contracts at lower temperatures until it contacts the bimetallic springs.

Another device for carrying out the process can consist of a membrane that is stretched in a housing of a filter built into a fuel line between a filter element and a compensation chamber, is acted on by a spring in the compensation chamber and contacts an expander inside the filter element.

A thermal expansion element serving as the expander can comprise a housing containing a highly thermally expandable material which forces a piston with a projection out from the housing and displaces the membrane against the force of the spring. The substance which greatly expands on heating, preferably a wax, forces the piston out of the housing as it warms up and moves the membrane towards the compensation chamber, whereby the volume in the filter chamber is correspondingly changed. The spring ensures that the membrane always contacts the piston so that with even the slightest movements of the piston the volume of the compensation chamber, which is varied by the changing position of the membrane, is correspondingly changed. The strength of the spring is such that it does not influence the displacing force exerted by the expander; the position of the piston depends solely on the temperature of the fluid.

The invention will now be described in more detail with reference to the exemplary embodiment shown in the drawings, in which.

Figure 1:
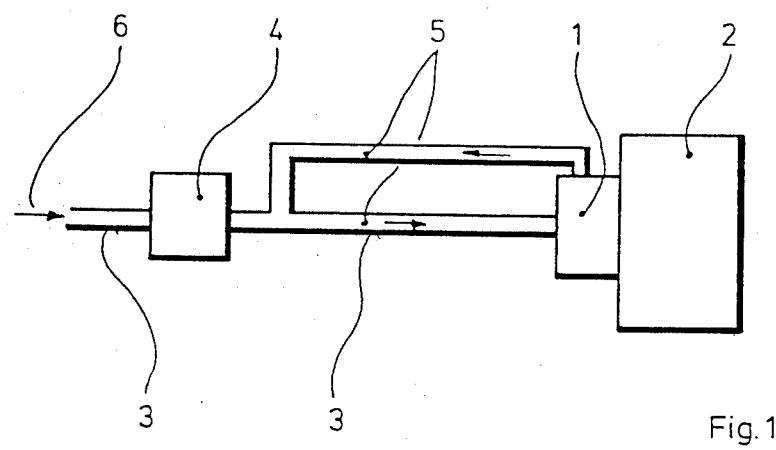
FIG. 1 shows diagrammatically the construction of a measuring system for measuring the fuel consumption of an internal combustion engine with fuel injection.

In the measuring arrangement shown in FIG. 1 for determining the fuel consumption a flow meter 4 is arranged in a fuel line 3 ahead of an injection system 1 of an internal combustion engine 2. A return line 5 from the injection system 1 opens into the fuel line 3 beyond the flow meter 4 in the main direction of flow of the liquid, as shown by arrow 6.

The lines 3, 5 contain a relatively large volume of fuel, that is somewhat further increased by devices required for the functioning for the overall system, for example bubble separators, filters, valves and heat exchangers.

Figure 2:
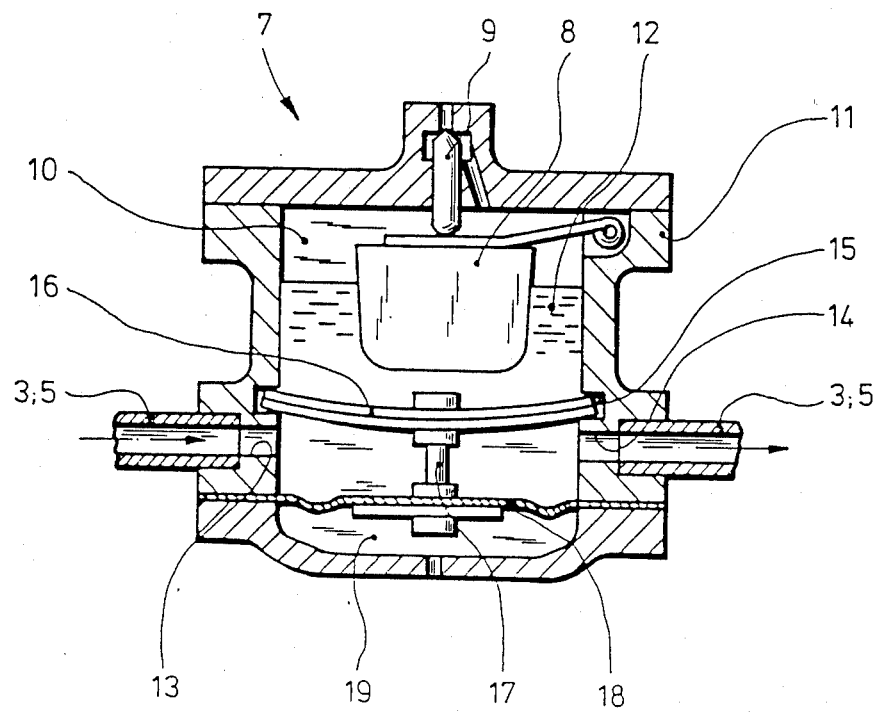
FIG. 2 is a sectional view of a gas bubble separator with a volume compensation device.

So that the volume of liquid in the lines 3 and/or 5 between the meter 4 and the injection system 1 does not cause errors in measurement when changes in temperature occur, automatic volume compensation can be effected by a bubble separator 7, shown in FIG. 2, which is frequently arranged in the return line 5. So that gas bubbles can separate and escape into the atmosphere through a needle valve 9 operated by a float 8, there is a relatively large volume of liquid 12 in a liquid chamber 10 of the separator casing 11. In the liquid chamber 10 a bimetallic spring 16 is inserted in a groove 15 above the inlet and outlet ports 13, 14 connected to the return line 5, and is connected via a connecting rod 17 so as to move with a membrane 18 that is fixed and stretched in the separator housing beneath the ports 13, 14. The membrane 18 separates the liquid chamber 10 from a compensation chamber 19 bounded by the membrane 18 so as to have a variable capacity.

When the gas bubble separator 7 is arranged in the return line 5 it is often unavoidable that the liquid flowing into the liquid chamber 10 through the inlet port 13 is warmer than the liquid in the meter and in the fuel line 3 leading to the internal combustion engine 2. Without precautionary measures the flow meter 4 would then register the increasing liquid volume caused by the increasing temperature as a decreased fuel consumption. However, because it is coupled with the membrane 18 the bimetallic disc 16, which bulges to a greater extent towards the membrane 18 as the temperature increases, simultaneously moves the membrane 18, by means of the connecting rod 17, further into the compensation chamber 19. Thus there is more space available in the liquid chamber 10 corresponding to the change in volume caused by temperature; the quantity flowing through the meter 4 then corresponds to the quantity consumed by the injection system 1.

Figure 3:
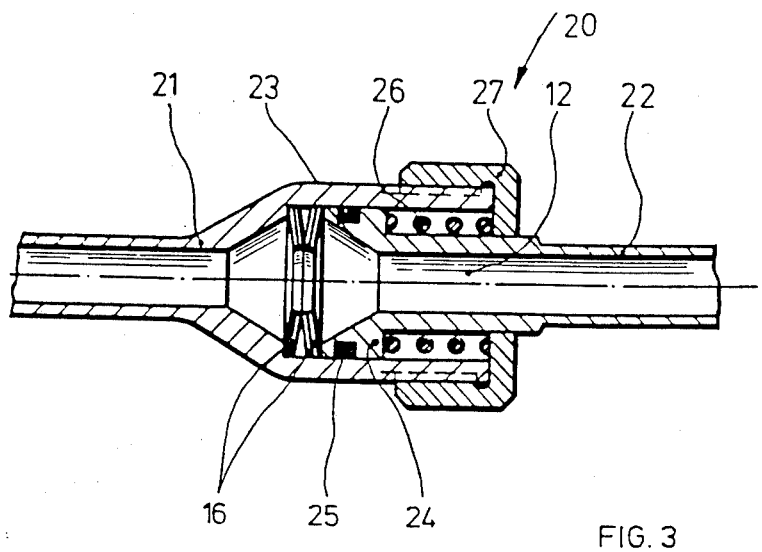
FIG. 3 is a sectional view of a volume compensation device integrated into a pipeline.

As shown in FIG. 3, an extendable tube connection 20 integrated into a fuel line comprises two tubes 21, 22 pushed into one another, of which the tube 21 is formed as a sleeve tube with a sleeve-like, i.e. greater diameter, end 23. The tube 22 which fits into the sleeve tube end 23 is formed as a movable telescope tube with a piston-like projection 24 sealed with a seal 25 and lies with its piston face against two bimetallic discs 16 supported in the sleeve tube end; the telescope tube 22 is acted on by the force of a spring 26 which acts on the face of the piston rod. The bimetallic discs 16 through which the fluid flows are arranged so that their rims bend or bulge in opposite directions, i.e. away from one another, whereby the stroke of the telescope tube 22 in the sleeve tube end 23 is doubled. A bushing 27 screwed on a threaded section of the sleeve tube end 23 holds the tubes 21, 22 that are pushed one into the other in position. If liquid having a temperature higher than the starting temperature flows through the tubes, the bimetallic discs 16 bulge as shown in FIG. 3 and push the telescope tube 22 out of the sleeve tube 23 against the force of the spring 26 until the greater liquid volume 12 caused by the heating up is compensated.

Figure 4:
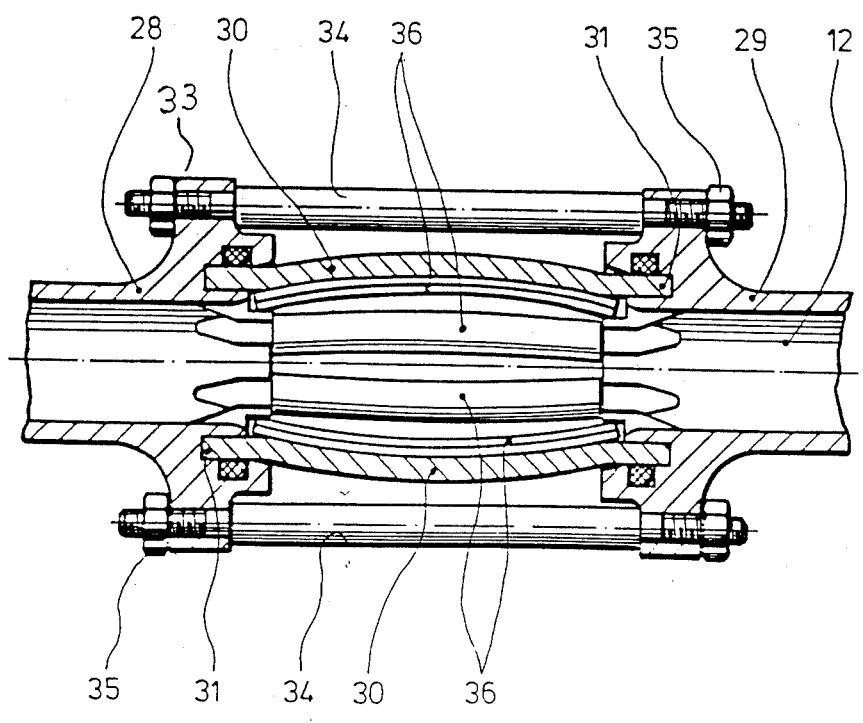
FIG. 4 is a sectional view of a second embodiment of a volume compensation device integrated with a pipeline.

Another embodiment, shown in FIG. 4, of a volume compensation device integrated with the fuel lines 3 or 5 consists of two spaced, opposed tube ends 28, 29 arranged in lines and coaxial. The gap between the two tube ends is bridged by a hose-like flexible connecting piece 30 that engages in annular grooves 31 in the faces of the tube ends 28, 29 and is sealed there with seals 32. Bolts 34 passing through flanges 33 in the tube ends 28, 29 hold the tubes 28, 29 in position in the longitudinal direction on tightening up nuts 35 so that the tube ends cannot separate from on another, i.e. so that the distance between the tube ends is always the same. The elastic connecting piece 30 surrounds a supporting jacket formed of separate strip-like bimetallic springs 36, i.e. the bimetallic strips 36, which are for example each fixed in the end faces of the tube ends below the connecting piece 30, support the connecting piece 30 like a corset. At higher liquid temperatures and thus greater liquid volumes 12 the bimetallic strips 36 bend outwards and bulge the connecting piece 30 radially outwards to an extent corresponding to the liquid volume 12 resulting from the temperature, so that a larger space is available. The fixed position of the tube ends 28, 29 prevents compensation of the increasing space.

Figure 5:
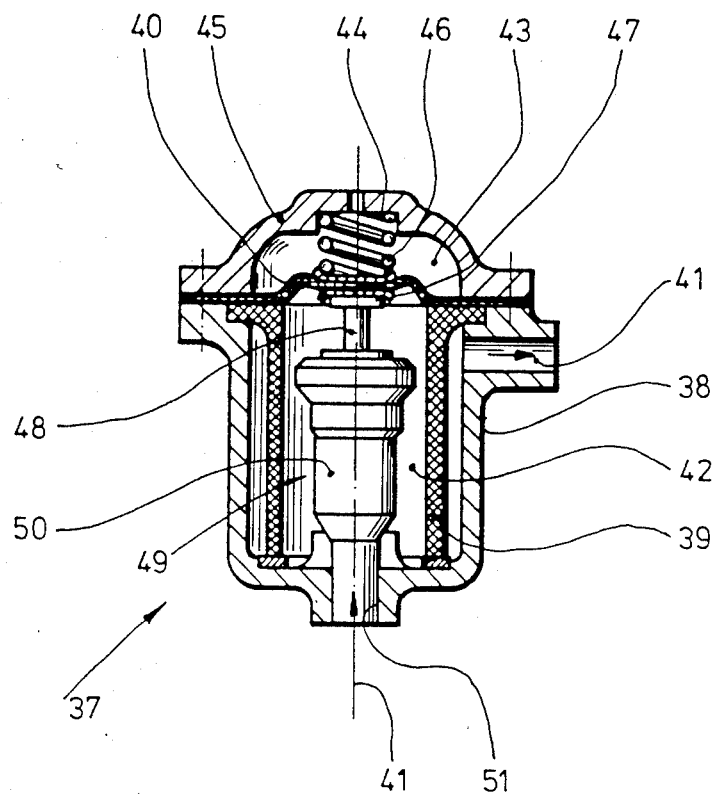
FIG. 5 shows, in section, a volume compensation device arranged in a fuel filter.

The volume compensation device shown in FIG. 5 is arranged in a filter 37 connected to the fuel line 3. A membrane 30 stretched in the filter housing 38 above a filter element 39 separates a liquid chamber 42 through which the flow passes in the direction of the arrow 41 from a compensation chamber 43 above the membrane 40. A spring 46 supported in a recess 44 of a housing cover 45 above and against the membrane 40 presses this until it comes up against a projection 47 on the piston 48, which projects from an expander 49. The expander 49, which extends in the interior of the filter element 39, is supported on a projection from an inlet connection 51. The expander 49 is a known component in which a highly thermally expandable substance, e.g. a wax, is contained in a housing 50. A higher temperature of the liquid flowing in direction of the arrow 41 brings about an outward movement of the piston 48 whereby the membrane 40 is displaced against the force of the spring 46 so as to reduce the space in the compensation chamber and, to the same extent, to increase the volume of the liquid chamber 42. A cooler liquid has the opposite effect, i.e. the piston 48 is forced by the spring 46 deeper into the housing 50 and the membrane 40 is moved deeper into the liquid chamber 42, the volume of which is thereby reduced.

What is claimed is:

1. A process for measuring, by means of a flow meter, the flow of fluid supplied to a consuming device and subject to temperature variations, and particularly for measuring the fuel consumption of an internal combustion engine with fuel injection, wherein the volumetric capacity of the system between the flow meter and the consuming device is automatically increased or decreased to compensate for changes in the volume of the fluid in said system due to changes in its temperature.

2. A device for measuring the flow of fluid supplied to a consuming device and subject to temperature variations, comprising a flow meter in the fluid supply line and means arranged in the system between the flow meter and the consuming device for changing the volumetric capacity of the system in response to changes in the temperature of the fluid in the system to compensate for changes in the volume of the said fluid due to said changes in temperature.

3. A device according to claim 2, wherein said compensating means comprises a gas bubble separator that includes a fluid chamber having fluid inlet and outlet ports connected to the system, a compensation chamber separated from said fluid chamber by an adjusting member below said ports, and a bimetallic spring in said fluid chamber coupled with said adjusting member.

4. A device according to claim 3, wherein said adjusting member is a membrane coupled to said bimetallic spring by a rod.

5. A device according to claim 2, wherein said compensating means comprises an extendible pipe connection in said system comprising interengaging, relatively telescopically displaceable inner and outer tubes.

6. A device according to claim 5, wherein said inner tube engages in a sleeve-shaped end of said outer tube and is urged by a spring against a bimetallic disc held in said outer tube.

7. A device according to claim 6, wherein two bimetallic discs are arranged in mutual contact in said outer tube so as to bend out in opposite directions.

8. A device according to claim 2, wherein said compensating means comprises a hose-like, flexible connecting piece that is fixed between two opposed, coaxial tube ends spaced apart in said system and surrounds a jacket made up of bimetallic springs.

9. A device according to claim 8, wherein said springs are bimetallic strips extending between said tube ends.

10. A device according to claim 2, wherein said compensating means comprises a filter included in the system, said filter including a compensation chamber, a membrane stretched in the filter housing between a filter element and said compensation chamber and acted on by a spring in said compensation chamber, and an expander arranged inside the filter element and in operative contact with said membrane.

11. A device according to claim 10, wherein the expander comprises a thermal expansion element made up of a housing containing a highly thermally expandable substance and a piston projecting from the housing and arranged to be forced out of the housing by the expansion of the expandable substance and thereby to displace the membrane against the force of the spring.

* * * * *